Jan. 24, 1928.
J. H. F. FITGER
1,657,383
LIQUID METER
Filed Aug. 10, 1926
8 Sheets-Sheet 1
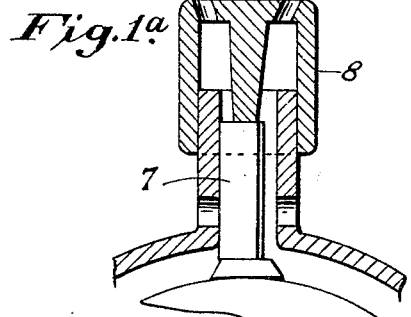
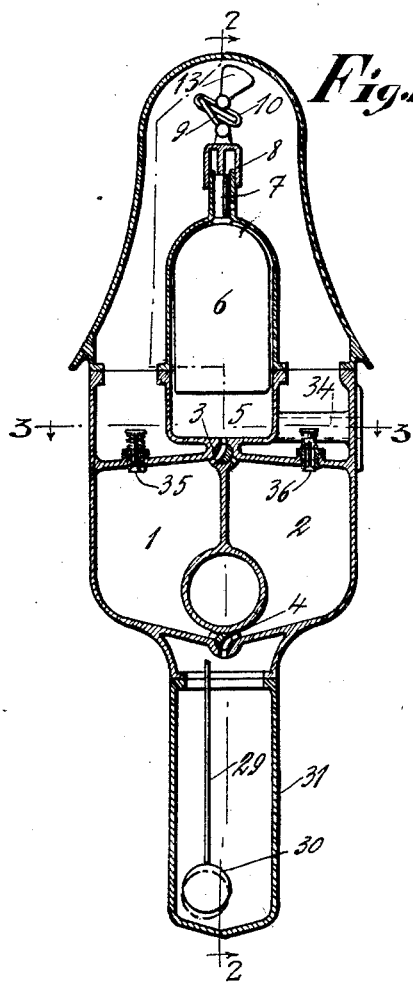
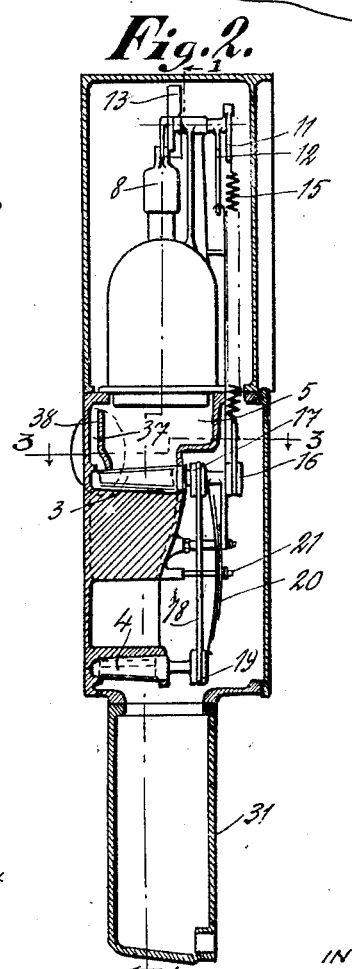
INVENTOR
JUSTUS H. F. FITGER
BY
*Munn & Co*
ATTORNEYS

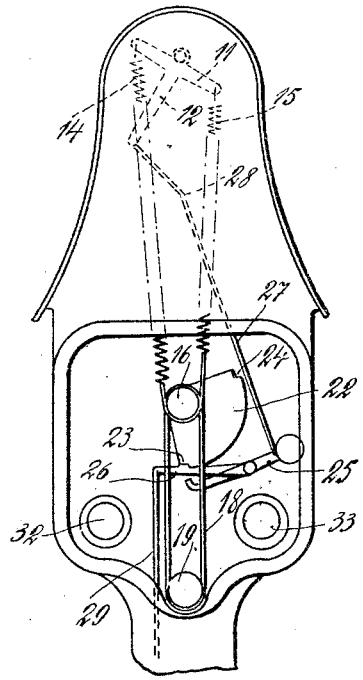
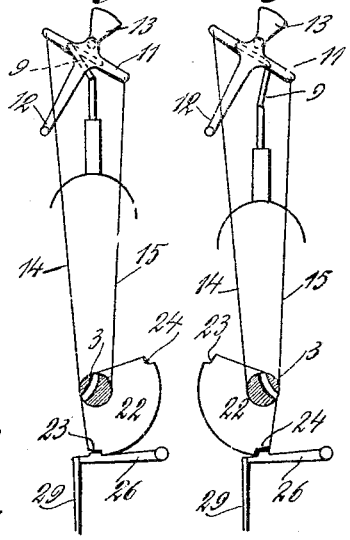
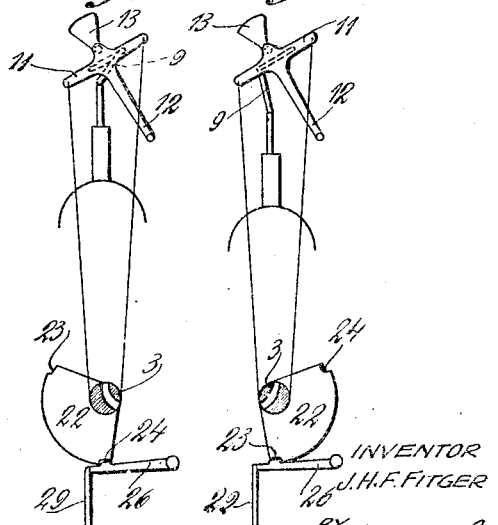
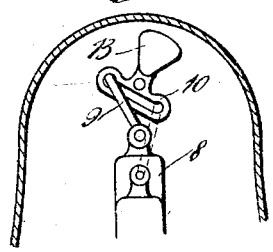

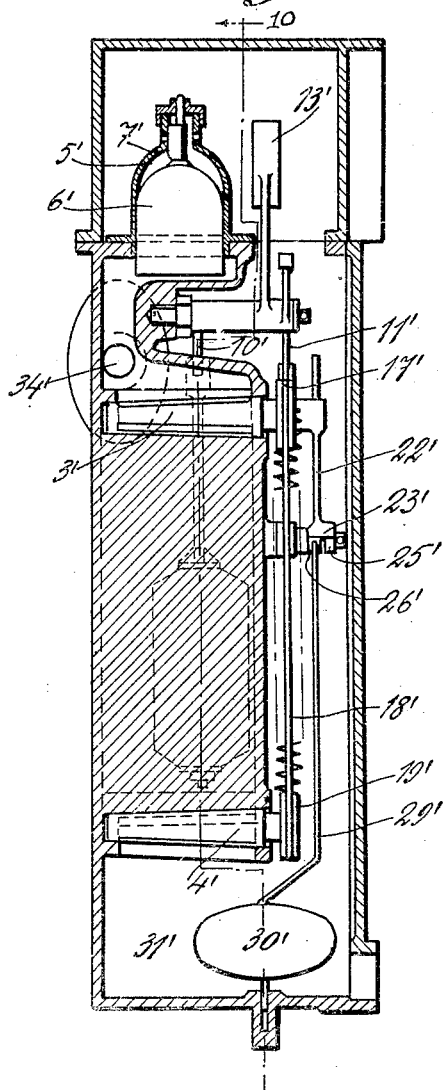

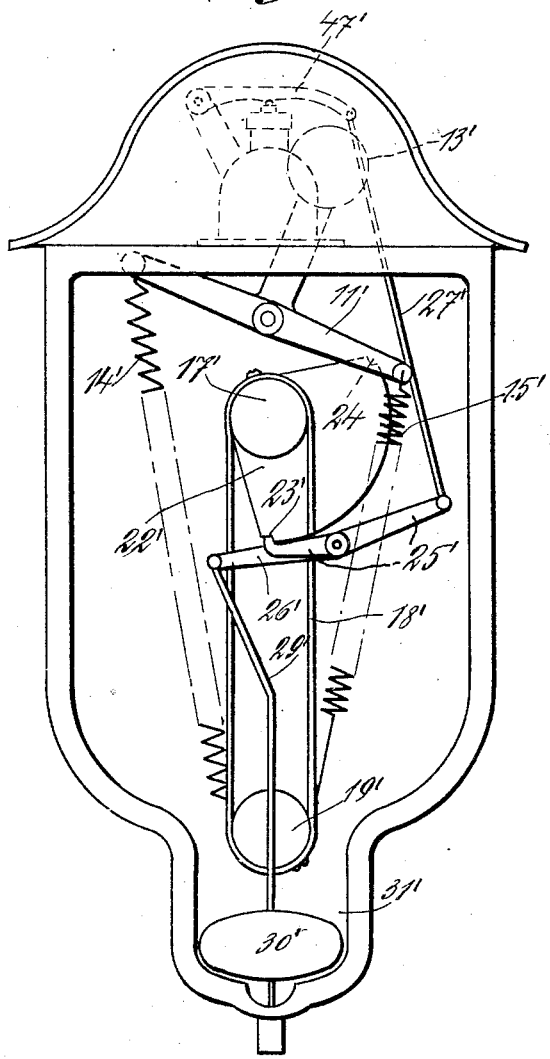

Jan. 24, 1928.  
J. H. F. FITGER  
LIQUID METER  
Filed Aug. 10, 1926  
1,657,383  
8 Sheets-Sheet 6
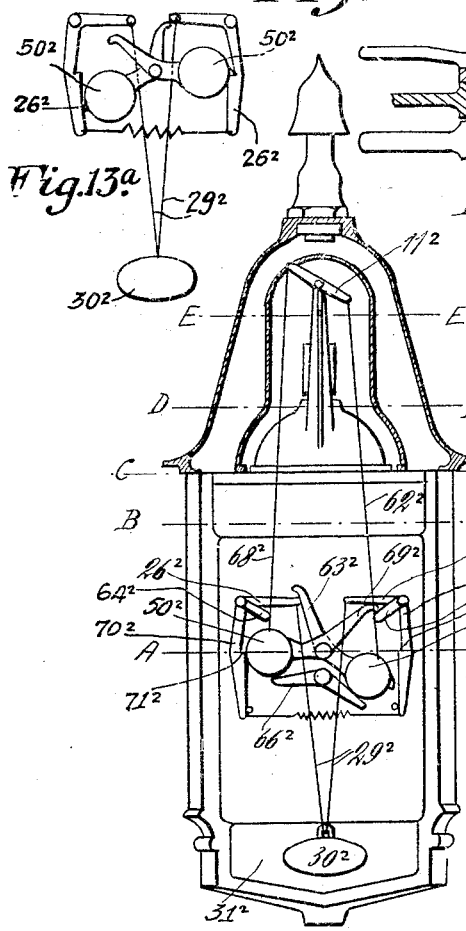
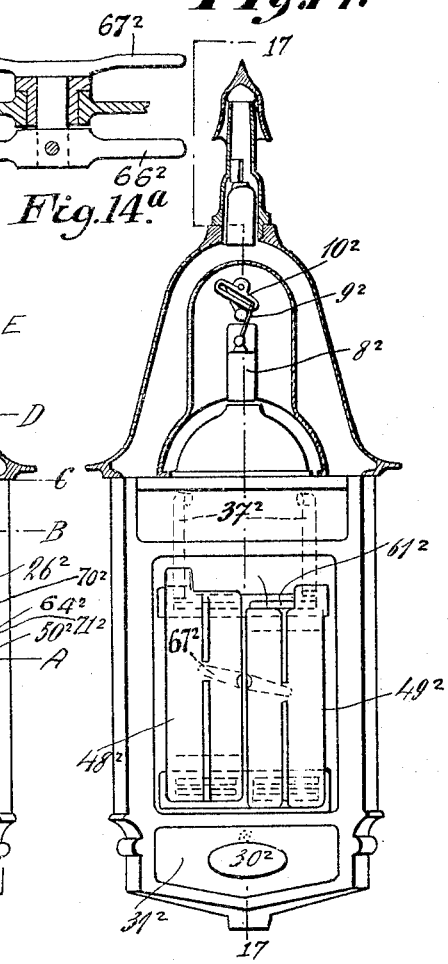
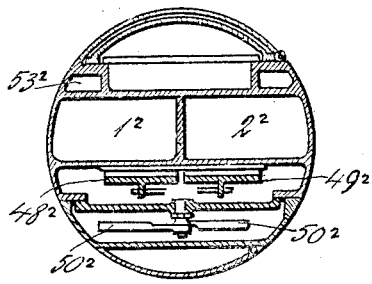
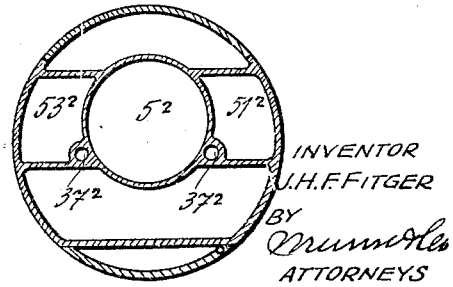
INVENTOR  
J.H.F.FITGER  
BY  
ATTORNEYS Jan. 24, 1928.

J. H. F. FITGER

LIQUID METER

Filed Aug. 10, 1926      8 Sheets-Sheet 7

1,657,383

INVENTOR
J.H.F.FITGER
BY
ATTORNEYS

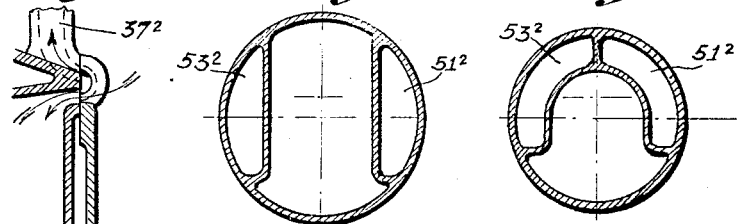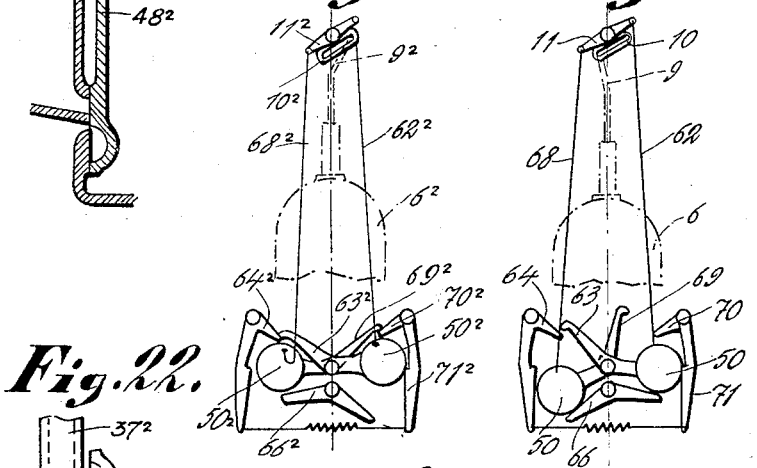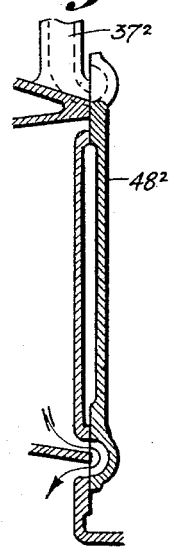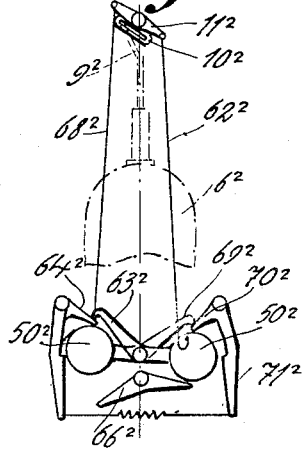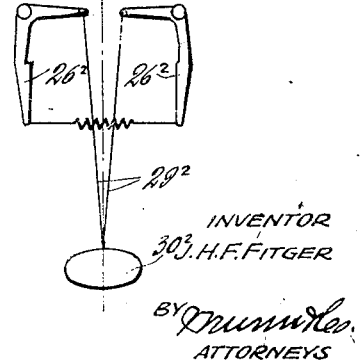

Patented Jan. 24, 1928.

1,657,383

UNITED STATES PATENT OFFICE.

JUSTUS HERMAN FERDINAND FITGER, OF MIDSOMMARKRANSEN, SWEDEN.

LIQUID METER.

Application filed August 10, 1926, Serial No. 128,428, and in Sweden May 25, 1925.

This invention refers to such liquid meters, as are provided with two or more stationary vessels, which are alternately filled and emptied and in which the streaming in and out of the liquid is regulated by a valve device or the like.

Figure 10:
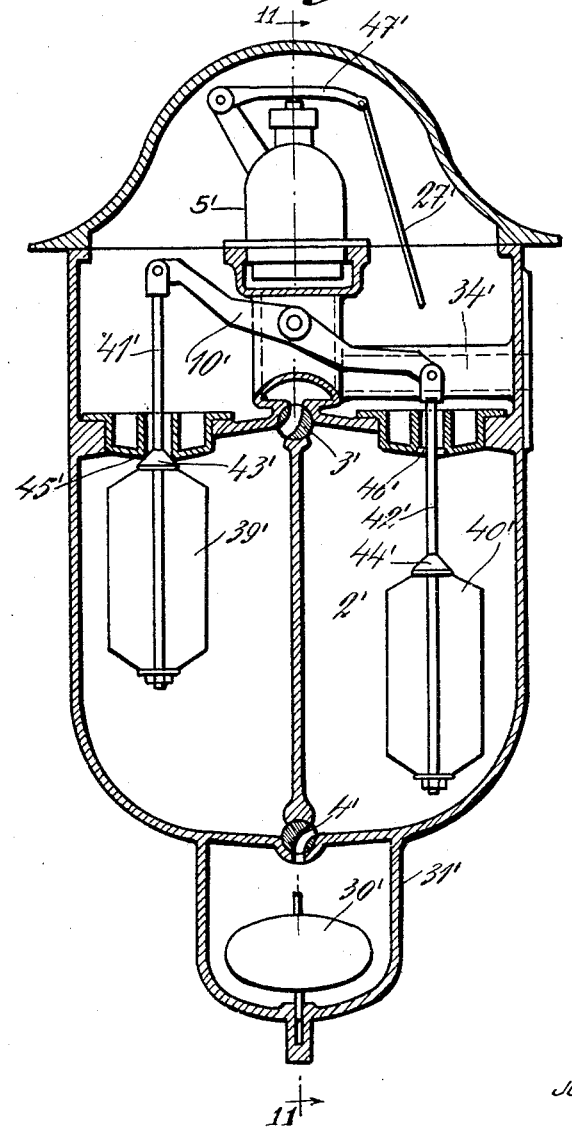
Figure 17:
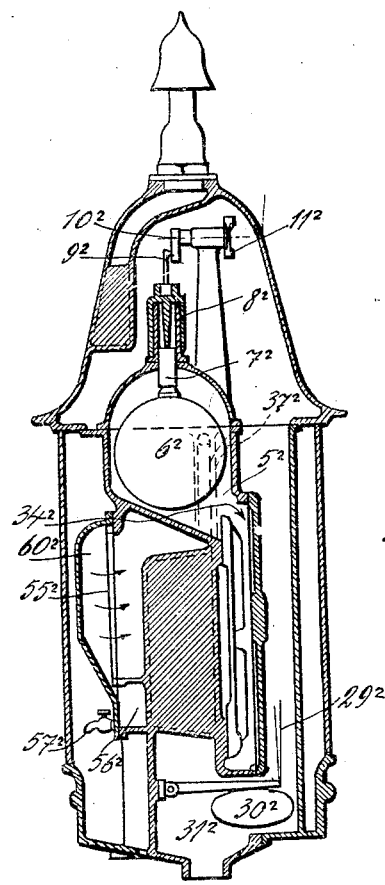
Figure 18:
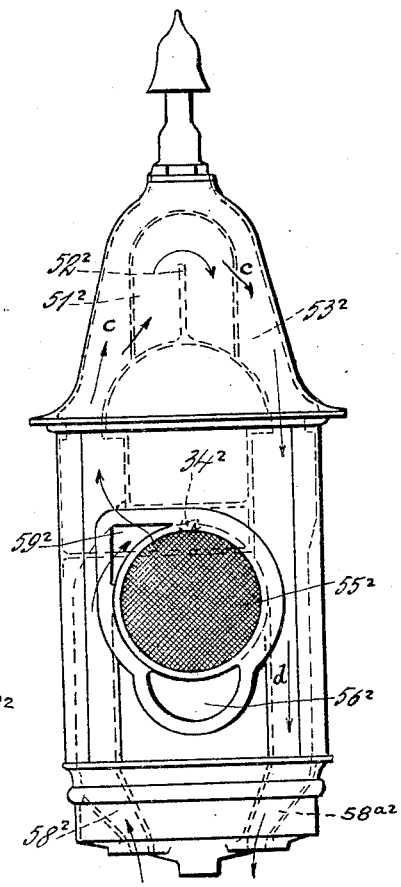
Figure 19:
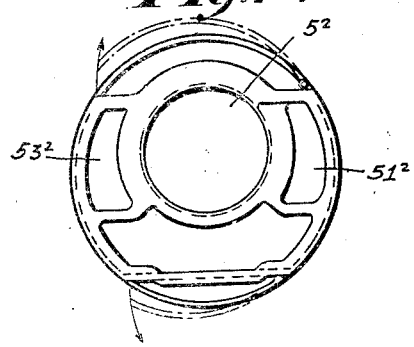
Figure 20:
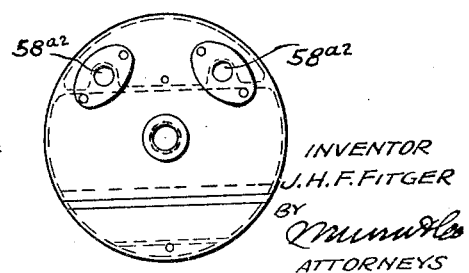

In the accompanying drawings three constructions of the measuring device are shown, each provided with a special float chamber, situated outside the measuring vessels. Figs. 1–9 show a construction, intended for being arranged on a wall. Fig. 1 is a cross section in front view through the measuring apparatus on line 1—1 of Fig. 2. Fig. 2 is a cross section through the measuring apparatus taken at right angles to that of Fig. 1 on line 2—2 of said figure. Fig. 3 is a horizontal section through the inlet channel of the apparatus on line 3—3 of Figs. 1 and 2. Fig. 4 is a front view of the measuring apparatus with the cover taken away. Fig. 5 shows the upper part of the measuring apparatus on a larger scale. Figs. 6, 7, 8 and 9 show schematically the different positions of the operating parts in the course of a measuring period. Fig. 1ᵃ is a sectional view of the top float valves in the construction shown in Figures 1 to 9. Figs. 10–12 show the second construction. Figs. 10 and 11 are two cross sections through the measuring apparatus at right angles to each other, Fig. 10 being a section on line 10—10 of Fig. 11, and Fig. 11 a section on line 11—11 of Fig. 10. Fig. 12 is a front view of the regulating device, the front cover plate being removed. Figs. 13–28 show the third construction. Fig. 13 is a front view partly in section of the measuring apparatus with one cover taken away. Fig. 14 is a front view partly in section with both covers taken away. Fig. 15 is a horizontal section taken on the line A—A of Fig. 13. Fig. 16 is a horizontal section on the line B—B of Fig. 13. Fig. 17 is a cross section through the middle of the measuring apparatus, on line 17—17 of Fig. 14, seen from the side. Fig. 18 shows a back view of the measuring apparatus with the rear cover removed. Fig. 19 is a top view of the apparatus with the parts above line C—C in Figure 13 removed. Fig. 20 shows the measuring apparatus from below. Fig. 21 is a detail sectional view showing a regulating slide valve in position to admit the liquid to one vessel. Fig. 22 is a similar view showing the regulating slide valve in position to permit the outflow of the liquid. Fig. 23 is a horizontal section taken on the line D—D of Fig. 13. Fig. 24 is a horizontal section on the line E—E of Fig. 13. Figs. 25, 26 and 27 show schematically the different positions of the regulating mechanism during a measuring period. Fig. 28 shows a pair of pawls with the float which operates them. Figure 13ᵃ shows the pawls shown in Figure 28 and weights controlled by the pawls. Figure 14ᵃ shows the connection between two of the arms.

One form of the measuring apparatus consists of two stationary measuring vessels 1, 2 beside each other and two three-way cocks 3, 4, the upper, 3, of which serves to regulate the inflow of liquid to the measuring vessels, while the lower regulates the outflow from the measuring vessels. Above those there is a chamber 5, containing a float. The chamber 5 can at the top be closed by a cone valve 7, which is fixed to the valve cap 8. An arm 9 is at one of its ends pivotally connected to the cap 8 and at the other end is provided with a journal movable in a groove in an arm 10, arranged on a shaft. This groove is at both of its ends turned slightly upward, as shown in Figure 5. When the cap 8 stands in lowest position, the top end of the arm 9 is always resting in the lowest part of the said grooves. When the cap moves upward, the arm 9 cannot move in the groove due to the angle between the arms 9 and 10 and due to the above mentioned upward turned parts of the groove and the arm 10 must therefore be turned. When the cap 8 moves downward again, the arm 10 is held in its position by the counterweight 13 and the upper end of the arm 9 will slide in the groove of the arm 10. On the same shaft as the arm 10 two other arms 11, 12 and a counterweight 13 are placed. To each end of the arm 11 a coil-spring 14 or 15 is fixed. The other ends of those springs are by means of flexible wires or chains connected to a spool 16, attached to the cock plug 3. On this plug there also is another spool 17, which by means of a flexible wire or chain 18 is connected to the spool 19 on the cock plug 4. A spring 20, which can be tensioned by means of a screw 21, keeps the turning plugs pressed in and snugly fitting their respective casings.

On the plug 3 there is provided a sector-formed plate 22, provided with two notches 23, 24, into which two pawls 25, 26 may enter. The pawl 25 is connected with the arm 12 by means of a flexible wire or the like 27. In order to increase the throw of the pawl 25 the wire 27 is led through a wire eye 28. The pawl 26 is by means of a rod 29 attached to a float 30 in a vessel 31. The liquid streams into the apparatus through an inlet channel 34 (Figs. 1 and 3). Each of the measuring vessels is provided with a valve 35, 36, each closed by spring, in order to let in air when the vessel is emptying. During the filling of the measuring vessel the air, being in the vessel, escapes through a channel 37.

In operation liquid streams into one of the two measuring vessels through the cock 3, at the same time as the liquid, in the other measuring vessel, flows out through the cock 4. After the measuring vessel, under filling, has got filled, further liquid streams into the measuring apparatus and also fills the chamber 5, the float 6 rising and closing the valve 7. As soon as the measuring vessel, from which the outflow took place, becomes emptied, the cocks are automatically reversed by means of any mechanical or electric device, so that the then filled vessel will be emptied and the emptied one will be filled.

If one would follow the progress of a measuring operation, it is convenient to consider the period begun just before the cocks move in one or the other direction, for instance from the position, shown in Figs. 1 and 6, to the position, shown in Fig. 8. The requisite for this movement of the cocks taking place, is that the measuring vessel 1 as well as the float chamber 5 shall have been filled and that the float 6 shall have risen and adjusted the arms 10, 11, 12 in the positions, set forth in Figs. 1 and 6. Further the vessel 31 must have been emptied and the float 30 in consequence of that have taken the position, shown in Fig. 1 with dot and dash lines so that the pawl 26 is disengaged from the notch 23 of the plate 22. The two cocks 3 and 4, which are positively geared to each other by means of the chain 18, have thus become freed and turn, influenced by the spring 14, to the position set forth in Fig. 7. In Figs. 6-9 it has been considered sufficient to show one of the cocks. When the cocks are turned, the measuring vessel 2 will be brought into communication with the float chamber 5, and the other measuring vessel 1 will begin to empty through the cock 4 which is opened. When the vessels 2 and 5 have been connected through the cock 3, the liquid flows from the chamber 5 down into the measuring vessel 2, the float 6 then sinking and the arm 9 sliding in the groove of the arm 10 to the position, shown in Fig. 7. However fresh liquid is also flowing in through the inlet channel 34, but it is of importance, that the liquid may not flow in too speedily, otherwise the liquid surface in the chamber 5 would not sink and the arm 9 would not be able to take up the position shown in Fig. 7, which would be necessary in order that the cocks shall next time be able to turn. When the measuring vessel 2 has been filled, the liquid coming from the inlet channel fills the chamber 5 and lifts the float 6, which in turn causes the arms 10, 11 and 12 to be turned to the position, shown in Fig. 8, the spring 15 then being further tensioned and the spring 14 slacked. During this movement of the arms 10, 11, 12 the pawl 25 holds the plate 22, so that the cocks cannot be turned, until the arm 12 has nearly reached its end position, for the pawl 25 is not disengaged until the arm 12 nearly reaches its end positions. Soon after the liquid in the vessel 31 has discharged the float 30 sinks, it being held in lifted position while the liquid from the vessel 1 is flowing into the vessel 31. When the float 30 sinks, the pawl 26 is turned out of engagement with the plate 22, so that the cocks 3 and 4 under influence of the spring 15 can turn to the position shown in Fig. 9. The contents of the measuring vessel 2 will now flow out into the vessel 31, the float 30 then rising and allowing the pawl 26 to engage the plate 22. At the same time the liquid begins to enter vessel 1. The liquid which enters this vessel comes partly from the liquid channel 34 and partly from the chamber 5. Due to this emptying of the chamber 5, the float 6 will first sink. The arms 9, 10, 11 and 12 will then occupy the position shown in Figure 9. After a while the vessel 1 is filled. The liquid will then again enter chamber 5 and raise the float 6. The arms 9, 10, 11 and 12 will then return to their original positions as shown in Figures 1 and 6, and the operation is repeated.

When the liquid is to discharge from either of the measuring vessels 1 or 2, it must be replaced by air, that comes in through the valve 35 or 36. Either valve is kept open, when the vessel, in which it is arranged, is emptying, but is closed during filling of the same vessel. Also in the filling of a measuring vessel the air in it must be removed. An arrangement for this purpose is indicated in Figs. 2 and 3. A channel 37, at its top communicating with the chamber 5, is divided therebelow from the chamber 5 by means of a wall 38. At the bottom this channel runs to the cock plug 3 and thus communicates perpetually with the vessel being filled. When the chamber 5 is filled, the channel 37 too will become filled, but as soon as the filling of a measuring vessel begins, the liquid surface in the chamber 5 sinks and will shortly sink below the upper edge of the wall 38. Thereafter the liquid surface in the chamber 5 will sink slowly, partly on account of the large area thereof compared with that of the passage of the plug, and partly because while liquid is flowing from the chamber 5 down into the measuring vessel, fresh liquid flows in through the inlet channel 34. The liquid in the channel 37 on the contrary flows speedily down into the measuring vessel, the air of this vessel, which has been somewhat compressed during the first part of the filling period, then being able to discharge through the channel 37.

Another construction, according to the same principle, is shown in Figs. 10, 11 and 12. Most parts here are equivalent with the parts in the construction described above and therefore marked with corresponding numerals. However, some new parts are also shown in this construction.

The casing is constructed in a similar way as that of Figures 1 to 9. It consists of two measuring-vessels 1' and 2'. In the upper and lower ends of these vessels the three-way cocks 3' and 4' are placed. Above the cock 3' is a chamber 5' placed, just as in the first described construction, but in this case the chamber is made much smaller than there. Below the vessels is a chamber 31' placed in the same way as the chamber 31 in last described construction.

In each measuring vessel is provided a float, 39', 40'. These are by means of vertical rods 41', 42' jointed with the ends of arm 10'. The arms 10' and 11' and the counterweight 13' are mounted on the same long nave which is movable on a pivot, fastened on the casing. In the ends of the arm 11' are the springs 14' and 15' fastened. The other ends of these springs are fastened to the spool 19' in the same way as is described in the modification Figures 1–9. It has nothing to do with the working of the apparatus, that they in this modification are connected to the lower one instead of the upper one of the cocks, as in the first described, because in both cases the cocks are connected to each other. The floats 39', 40', are at their tops provided with conically turned seats 43', 44', which are made to fit tight against the corresponding conical parts 45', 46', in the measuring vessels. The float 6' in this modification has nothing to do with the tightening or slacking of the springs, but only to operate the pawl 25', which prevents the cocks from turning till the chamber 5' is filled and this cannot be done unless the measuring vessel is filled. The float 6' is connected to the pawl by means of the arm 47' and the rod 27'. (Fig. 12.) On the same pivot as the pawl 25' is also the pawl 26' mounted in the same way as described in the first modification.

The function during one measuring period is the following: Liquid enters through the channel 34' and the threeway cock to the measuring vessel 1. The float 39' rises and the float 40' in the measuring vessel 2' sinks. When the vessel 1 is full the floats have the positions shown in Fig. 10. Thereby has the springs 14' been tensioned and the spring 15' been slacked. The three-way cocks are kept in their positions as long as the pawls 25' and 26' are engaged with the plate 22'. These are disengaged when the float 30' has sunk and the float 6' has risen, that is under the same conditions as described in the first modification. As soon as the plate 22' is made free, the three-way cocks will, under the influence of the springs 14', 15' turn to a position, in which the cock 3' opens the measuring vessel 2' for filling and the cock 4' opens the measuring vessel 1' for tapping. Thereby first the float 6' will sink and the float 30' rise and later, after the vessel 2' has been filled the float 6' will rise again and the float 30' will sink again. The next measuring period will then proceed in the same way as here described.

In this construction one gains the advantage over that first described, in that the float 6' can be made much smaller than 6, while its movement is only used for regulating the pawl 25'. The comparatively heavy work to set the spring 14', 15' is performed by the floats 39', 40'. Concerning the said floats their specific gravity is not important, in contra-distinction to the float 6', that ought to have as low specific gravity as possible, at any rate lower than that of the liquid. Nor in this construction may the liquid flow away into the measuring apparatus too quickly, for the arm 47' must be able to sink and operate upon the pawl 25', so that it may keep the cocks in position, until the measuring vessel being under filling, as well as the chambers 5 have got filled.

Figs. 13–28 show a third construction of the liquid meter, suitable to arrange on a detached plate-column and intended for use as tapping station for sale of petrol.

This construction differs from that first described (Figs. 1–9) essentially in that the three-way cocks 3, 4 are replaced by common slide valves 48, 49 and in that the spiral springs 14, 15 are replaced by weights $50^2$ and $50^{a2}$.

The liquid meter according to this modification is intended for being fed directly from a handpump. On the bottom of the meter are two oval flanches $58^2$ and $58^{a2}$ arranged. When the meter is mounted for sale from an underground storage cistern one pipe goes from the bottom of the cistern to a pump and from the pump to the flanch $58^2$. Another pipe, the return pipe, goes from flanch $58^{a2}$ to the top of the cistern. The liquid therefore will enter the meter through the flanch and the pipe $58^2$.

The main parts of the meter in this modification are arranged as follows: Two measuring vessels $1^2$ and $2^2$ are placed beside each other (Fig. 15). These vessels have on their front side openings in their upper and lower ends, which openings are covered by the plane slide valves $48^2$ and $49^2$. Above the measuring vessels and in communication with the chamber containing the slide valves is placed the float chamber $5^2$, containing the float $6^2$. (Fig. 17). Below the center of the float $6^2$ is a hold $34^2$ provided, which connects the chamber $5^2$ with a special filter chamber. This filter chamber is divided in two parts through the filter cloth $55^2$. Below this filter chamber is a tank $56^2$ for gathering of separated impurities and a cock $57^2$ for draining of the same.

When the liquid has entered the meter through the pipe $58^2$ it passes through the opening $59^2$ Fig. 18 to the outer part of the filter chamber. From there the cleaned liquid passes through the filter cloth, while the impurities sink down to the chamber $56^2$. The cleaned liquid passes through the hole $34^2$ to the float chamber $5^2$ and from there to one of the measuring vessels. If the slide valves stand in the positions shown in Fig. 14 the liquid will enter the right hand vessel $2^2$. After this vessel has been filled the liquid rises into the float chamber $5^2$ and lifts there the float $6^2$. When this chamber, too, is filled a special way is arranged for the liquid further pumped to avoid a too high pressure on the slides and also to avoid a too speedy filling of the vessels. The superfluous liquid passes from the inner part of the filter chamber, through the chamber $51^2$, (as shown by the arrows $c$ in Fig. 18), over the overflow partition $52^2$ and through the chamber $53^2$ to the flanch $58^{a2}$ (as shown by the arrows $d$ in Fig. 18) and through the above mentioned return pipe back to the storage cistern. The channels $37^2$ have the same purpose as the channel 37 of Fig. 3, though this construction is provided with one channel for each measuring vessel.

It is above described how the liquid first fills the vessel, in this case the vessel $2^2$, and afterwards the chamber $5^2$. During the filling of the chamber $5^2$ the float $6^2$ will rise. In the same way as described in the first modification the arm $9^2$ will turn the arms $10^2$ and $11^2$. These will then lift one of the weights, in this case the weight $50^2$, (always the one on the same side as the vessel just filled) from the position shown in Fig. 13. When this weight has nearly reached its top position the pawl $71^2$ snaps in and prevents the weight from falling back. When the weight is lifted still a little higher the arm $63^2$, which is connected to the weight, will strike against the arm $64^2$ of the pawl $65^2$, so that this pawl will release the weight $50^{a2}$. The arms, pawls and weights have, in this moment the positions shown in Fig. 25. Supposing that also the pawls $26^2$, which are two and always act simultaneously and are influenced in the same way as the pawl 26 in the first described modification, are released, the weight $50^{a2}$ will fall down and turn the arm $66^2$ from the position, shown in Fig. 25 to the position, shown in Fig. 26. (In Figs. 25-28 the pawls $26^2$, which are in front of the pawls $64^2$ are left out for plainness). Now the arm $66^2$ is mounted on the same shaft as the arm $67^2$ which engaged the two slides $48^2$ and $49^2$. Consequently even the slides will move, and they will move so that the slide $48^2$ will sink down and thereby open the vessel $1^2$ for filling and the slide $49^2$ will be lifted, so that the vessel $2^2$ will be emptied. The slide positions for inlet and outlet are clearly shown in the Figures 21 and 22. When the liquid enters the vessel $1^2$, the float $6^2$ will first sink and then lift again, as described by the other modifications. After it thus has been raised again, the different parts obtain the positions, shown in Fig. 27, whereby the weight $50^2$ is released and will drop down to turn the arm $66^2$ and therewith also the slides back to their original position as shown in Figs. 13 and 14.

The inlet and outlet of the air from the measuring vessels can for instance be done through a narrow pipe extending upwards from the measuring vessels which pipe may be without any valve devices. If the pipe is narrow enough, the measured volume of liquid will be affected very little.

Having now described my invention, what I claim as new and desire to secure by Letters Patent is:

1. In a liquid meter, two vessels, a chamber above the vessels, said chamber having constant communication with the measuring vessel, a valve controlling said chamber and adapted to prevent the liquid from escaping prior to measurement, a float in the chamber and operatively connected with the valve, valves alternately admitting and discharging liquid into and from the vessels, and means operated by the valve of the chamber, when said valve is operated by the float, for controlling the movement of the admission and discharge valves of said vessels.

2. A liquid meter comprising two vessels, valves for alternately admitting and discharging liquid into and from these vessels, means for causing the valves to move in unison, float-controlled means for operating the valves, locking means for the valves, a chamber, a float in said chamber, and means controlled by said last named float for releasing the locking means.

3. In a liquid meter, two vessels, a chamber located above said vessels, said chamber being in constant communication with the measuring vessel, a float in said chamber, valves operating in unison to admit and discharge liquid from the vessels, means controlled by said float to operate said valves, means for locking said valves, and means for releasing said valve locking means.

4. In a liquid meter including two vessels, a chamber located above said vessels, said chamber being in constant communication with the measuring vessel, a valve for said chamber, a float in the chamber and operatively connected with said valve, a pivoted lever operated by said valve, means operatively connecting the float and the valve, whereby to alternately admit liquid to and discharge the same from said vessels.

5. In a liquid meter including two vessels, a chamber located above said vessels, said chamber being in constant communication with the measuring vessel, a float in said chamber, a valve controlling said chamber and operated by said float, an armed lever, means for connecting said valve with said armed lever, a valve adapted to admit liquid to the vessels, and means operatively connecting said lever with said valve for operating the same.

In witness whereof, I have hereunto signed my name.

JUSTUS HERMAN FERDINAND FITGER.